(12) United States Patent
Moon

(10) Patent No.: US 10,770,722 B2
(45) Date of Patent: Sep. 8, 2020

(54) METHOD FOR PREPARING SILICON NANOCOMPOSITE DISPERSION USING PLASMA, AND ANODE ACTIVE MATERIAL AND LITHIUM SECONDARY BATTERY USING SAME

(71) Applicant: Kab Young Moon, Changwon-si (KR)

(72) Inventor: Kab Young Moon, Changwon-si (KR)

( * ) Notice: Subject to any disclaimer, the term of this patent is extended or adjusted under 35 U.S.C. 154(b) by 350 days.

(21) Appl. No.: 15/540,012

(22) PCT Filed: Apr. 3, 2015

(86) PCT No.: PCT/KR2015/003375
§ 371 (c)(1),
(2) Date: Jun. 26, 2017

(87) PCT Pub. No.: WO2015/160127
PCT Pub. Date: Oct. 22, 2015

(65) Prior Publication Data
US 2017/0365845 A1   Dec. 21, 2017

(30) Foreign Application Priority Data

Apr. 15, 2014   (KR) .......................... 10-2014-0044732

(51) Int. Cl.
| | |
|---|---|
| *H01M 4/36* | (2006.01) |
| *H01M 4/134* | (2010.01) |
| *H01M 4/38* | (2006.01) |
| *H01M 10/052* | (2010.01) |
| *H01M 4/04* | (2006.01) |
| *H01M 4/136* | (2010.01) |
| *H01M 10/0525* | (2010.01) |
| *H01M 4/02* | (2006.01) |
| *C25B 11/04* | (2006.01) |

(52) U.S. Cl.
CPC ......... *H01M 4/366* (2013.01); *H01M 4/0416* (2013.01); *H01M 4/134* (2013.01); *H01M 4/136* (2013.01); *H01M 4/386* (2013.01); *H01M 10/052* (2013.01); *H01M 10/0525* (2013.01); *C01B 2203/0861* (2013.01); *C25B 11/0421* (2013.01); *H01M 2004/027* (2013.01)

(58) Field of Classification Search
CPC ...... H01M 4/366; H01M 4/136; H01M 4/386; H01M 4/134
See application file for complete search history.

(56) References Cited

U.S. PATENT DOCUMENTS

| | | | |
|---|---|---|---|
| 2015/0086870 A1* | 3/2015 | Fukasawa ............ | H01M 4/131 429/218.1 |
| 2015/0325848 A1* | 11/2015 | Yamashita ............ | H01M 4/587 429/231.4 |

FOREIGN PATENT DOCUMENTS

| | | |
|---|---|---|
| KR | 10-2009-0125322 A | 12/2009 |
| KR | 10-1146914 B1 | 5/2012 |
| KR | 10-2013-0005102 A | 1/2013 |
| KR | 10-2013-0022438 A | 3/2013 |
| KR | 10-2015-0032778 A | 3/2015 |

OTHER PUBLICATIONS

Shang, T. et al, Core-Shell Si/C Nanocomposite as Anode Material for Lithium Ion Batteries. Pure Appl, Chem. 2006, vol. 78, pp. 1889-1896.
Zhang et al., "Core-shell Si/C nanocomposite as anode material for lithium ion batteries", Pure and Applied Chemistry, Jan. 2006.

* cited by examiner

*Primary Examiner* — Ladan Mohaddes
(74) *Attorney, Agent, or Firm* — Maschoff Brennan

(57) ABSTRACT

The present invention relates to a method for easily producing nanoparticles by expansion, explosion, vaporization, condensation and cooling of plasma in a liquid by means of heat resistance and, more particularly, to a method for preparing a silicon nanocomposite dispersion having a uniform carbon layer coated on the surface of silicon of which at least one area is connected to a silicon carbide formed by reacting a carbon in liquid (C) during expansion, explosion, vaporization, condensation and cooling, and applied products thereof.

1 Claim, 5 Drawing Sheets

•Si(P)MeOH Middle Dry

METHOD FOR PREPARING SILICON NANOCOMPOSITE DISPERSION USING PLASMA, AND ANODE ACTIVE MATERIAL AND LITHIUM SECONDARY BATTERY USING SAME

TECHNICAL FIELD

The present invention relates to a method for preparing a silicon nanocomposite dispersion and an anode preparation, and a lithium secondary battery using the same, wherein a silicon carbide is bonded to at least one region using a plasma, and a carbon layer-coated silicon nanoparticle is employed.

BACKGROUND ART

As an industrial trend is fast changing to an IT industry, an environment friendly energy industry and an electric vehicle industry, the demand for a lithium secondary battery as a power device is greatly increasing. Moreover, as an electronic device becomes compact-sized, the development on a high output and high energy density active substance, which may substitute a conventional electrode material of a lithium secondary battery, is widely underway.

In case of an anode, a theoretical capacity of graphite used for most of commercial lithium secondary batteries is about 372 mAh/g, and an inter-layer spreading speed of lithium is slow, for which a high speed charging and discharging are limited. A silicon composite anode material is gaining a great attention, which may be used to resolve the aforementioned problem and have been as an active substance for the past 20 years, wherein the theoretical capacity thereof is about 4200 mAh/g. In case of a silicon-graphite composite anode material, the development thereon is intensively underway in the related industry for the sake of an actual commercialization; however there still is a limit when competing with a conventional graphite in terms of its manufacturing process cost even though a good energy density and an enhanced charging and discharging service life.

In order to resolve a mechanical damage to an electrode and a fast service life decrease problem when using a silicon, which occur due to a volume expansion and contraction as it is repeatedly charged and discharged, like most of metallic substances which are electrically and chemically alloyed with lithium, it needs to increase performance through a nano-sized particle preparation, a nano-structural configuration, a nano-composite configuration and a complexation with a lithium activation/deactivation hetero-material.

Most of the researches focused on the preparation of a nano-sized silicon anode are being carried out, mainly, based on a mechanical crushing and a complexation, a vapor synthesizing method, a solution-based chemical synthesizing method, etc. Good results on the characteristic of a secondary battery anode are being reported; however there still is a problem in the way that a complicated process involved in a synthesis, a high material cost, an input of impurities, a waste thing treatment cost, an oxide production which is inevitably entailed during a synthesizing process, which makes hard to actually use it as a material for commercialization.

The high energy plasma technology of an electric explosion is referred to a massive synthesis technology of powder, and it has been developed for a long time. In recent years, an in-liquid electric explosion technology with respect to a semiconductor material has been developed (an application number 10-2008-0126028), which shows that a silicon may electrically explode in liquid; however the silicon is oxidized into $SiO_2$ in an aqueous solution, for which the silicon is not appropriate as an anode active substance for a lithium secondary battery.

DISCLOSURE OF INVENTION

The present invention is made in an effort to resolve the aforementioned problems. Accordingly, it is an object of the present invention to provide a method for preparing a silicon nanocomposite dispersion wherein a silicon carbide is bonded to at least one region, and a carbon layer-coated silicon nanoparticles is employed.

It is another object of the present invention to provide a method for preparing a silicon nanocomposite powder using a silicon nanocomposite dispersion.

It is further another object of the present invention to provide an anode and a lithium secondary battery formed of a silicon nanocomposite powder prepared by the aforementioned method.

To achieve the above objects, there is provided a silicon nanocomposite wherein a silicon nanoparticle is formed by a plasma energy in an organic solvent using a silicon material, and a silicon carbide is bonded to the surface of a particle or a carbon layer is coated thereon.

To achieve the above objects, there is provided a method for preparing a silicon nanocomposite dispersion wherein a silicon nanoparticle is formed in such a way to supply 5~20 kV voltages to a silicon material through an electrode using a plasma generator in an organic solvent and at the same time, a silicon carbide is bonded or a carbon layer is coated.

To achieve the above objects, there is provided a method for preparing a silicon nanocomposite powder in such a way to carry out a filtering, a centrifugation, a drying, a heat treatment, a disintegration, a disperse, a classification, etc.

To achieve the above objects, there are provided a silicon nanocomposite anode formed of an anode active substance including a silicon nanocomposite powder, a conduction material, and an anode material having a binder, and a lithium secondary battery made using the same, which has a low anode expansion ratio and a good room temperature service life characteristic and a good initial charging and discharging characteristic.

Advantageous Effects of the Invention

The method for preparing a silicon nanocomposite dispersion according to the present invention allows to provide a particle powder having an even granule, wherein a process is simplified, and an inputted energy is small, and a mass production is available at a low cost.

Moreover, the silicon nanocomposite dispersion prepared by the aforementioned preparing method is easy to use and is environmentally friendly since particles are dispersed in a liquid phase solvent.

In addition, the lithium secondary battery may resolve a fast service life decrease problem which occurs due to a reaction between an anode active substance made of a silicon nanocomposite powder and a lithium.

BEST MODES FOR CARRYING OUT THE INVENTION

Figure 1:
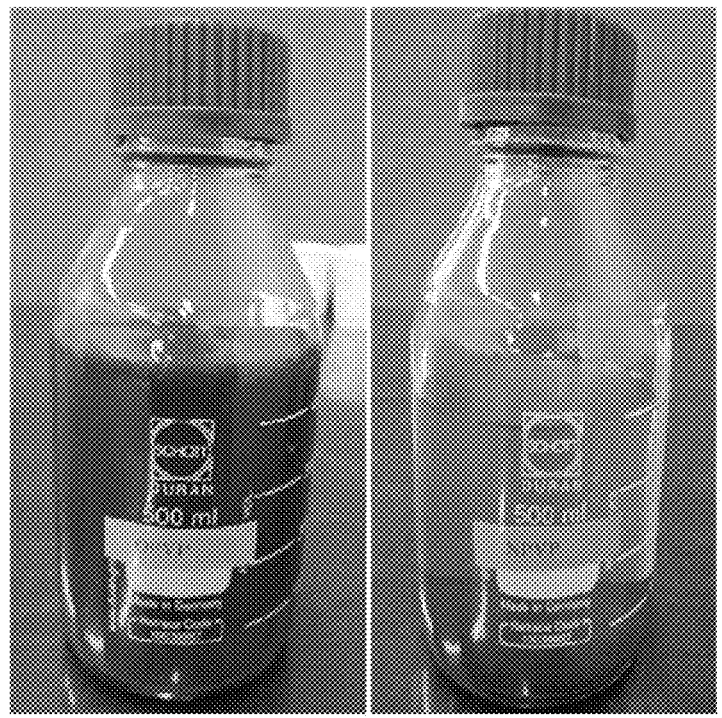
FIG. 1 is a photo showing a disperse stability of a silicon nanocomposite dispersion prepared according to the present invention.

Before the descriptions of the present invention, it should be understood that the terms used throughout the specification are meant to describe a specific embodiment, not meant to limit the scope of the present invention which is limited by only the claims. All technical terms and science terms used throughout the specification should be interpreted as having the same meanings as a person having ordinary skill in the art understands.

Throughout the specification and claims, unless otherwise stated the terms (comprise, comprises, comprising) mean "including a thing mentioned before, a step or a thing of a group and a step", not used to exclude any of a predetermined thing, a step or a thing of a group or a step of a group.

Meanwhile, unless it is stated to the contrary, various embodiments of the present invention may be combined with other embodiments. In particular, a predetermined feature which is considered as being preferred or advantageous, may be combined with a predetermined feature or features. The embodiments and effects of the present invention will be described.

A method for preparing a silicon nanocomposite and a dispersion for an anode active substance.

The present invention is referred to a silicon nanocomposite for an anode active substance wherein a silicon carbine is combined with at least one region of a silicon nanoparticle surface or a carbon layer is employed, and a method for preparing a silicon nanocomposite dispersion using a plasma in an organic solvent.

A silicon nanoparticle may be obtained from a silicon material, and an average size thereof is 50~300 nm in diameter. If the size is less than 50 nm, a silicon carbine may be easily made due to a strong activation of a silicon (Si) nanoparticle, for which it may not be used as a battery active substance, and if the size is over 300 nm, an expansion ratio may increase during a charging and discharging of a secondary battery, for which it is not appropriate for an actual use. It is preferred that the size thereof is 100 to 200 nm.

The silicon carbine bonding or carbon layer may be obtained from a silicon material and an organic solvent. The thickness of a silicon carbine bonding is 0.1~0.5 nm. If the thickness of the silicon carbine bonding is less than 0.1 nm, it is hard to obtain a strength strong enough to inhibit the expansion from a charging and discharging, and if the thickness thereof is over 0.5 nm, a charging or discharging may be limited due to a strong strength. For this reason, 0.2 to 0.3 nm is preferred. The thickness of a carbon layer is 3~15 nm. The silicon nanoparticle formation and the silicon carbine bonding or the carbon layer may become a plasma state due to a high voltage pulse current in the organic solvent and may finally form a silicon nanoparticle and at the same time may form a silicon carbine bonding or a carbon layer. The silicon carbine bonding has a function to reduce the anode expansion as the lithium secondary battery is repeatedly charged or discharged, and the carbon layer has a function to prevent the oxidation of a silicon nanoparticle.

In the silicon nanocomposite, a silicon carbine bonding may be formed at one or more than one region of the silicon nanoparticle surface, and the surface area where the silicon carbide bonding is formed, as compared to the whole surface area of the silicon nanoparticle is 10~50%, and preferably 15~30%. If it is less than 10%, the effect of lowering an anode expansion ratio may be very low, and if it is over 50%, the input of the lithium ion may be interrupted, thus lowering the efficiency of the lithium secondary battery. The carbon layer may be formed with 3~15 nm on the surface of the silicon nanoparticle or the silicon carbide bonding.

The method for preparing a silicon nanocomposite dispersion will be described in detail. The method for preparing a silicon nanocomposite dispersion may include, but is not limited to, (a) connecting a silicon material between a first electrode and a second electrode of a plasma generator in an organic solvent, and (b) supplying the voltage of 5~20 kV to the first electrode and the second electrode, wherein the step (b) may include (b-1) forming the silicon material with a silicon nanoparticle, and (b-2) forming a silicon carbide bonding or a carbon layer on at least one region of the surface of the silicon nanoparticle.

The parts by weight of the silicon material with respect to 100 parts by weight of the organic solvent is 1-20 [1 wt %~20 wt %]. If it is less than 1, a problem may occur in a yield. If it is over 20, a problem may occur, for example, a collision and an impact due to an interference with the previously produced particles owing to an increased density in a reactor, for which a surface damage and an increase fine particle may increase. More preferably, it is 3~7 parts by weight.

The organic solvent may include one or more of alcohols and material for mixing and may further include a dispersion agent, a surfactant and a carbon precursor. If a polyvinylpyrrolidone is added, a coagulation and precipitation of a prepared silicon nanocomposite are available. The polyvinylpyrrolidone may be added 0.01~1.0 parts by weight with respect to 100 parts by weight of the organic solvent, and the addition by 0.01~0.7 parts by weight is preferred, but it is not limited thereto. FIG. 1 shows a disperse stability of a dispersion (OPVP) containing a polyvinylpyrrolidone and a dispersion (NPVP) which does not contains the same. In case of the dispersion not containing the polyvinylpyrrolidone, a silicon nanocomposite was isolated after 24 hours, and in case of the dispersion containing the polyvinylpyrrolidone, it was confirmed that the silicon nanocomposite was evenly dispersed after 24 hours. If manufactured in the organic solvent, it is possible to prevent an over oxidation into $SiO_2$, which is different from the manufacturing in an organic solvent.

The silicon material is referred to a material containing an inorganic substance which has been processed in the form of a wire or a rod. The inorganic material may include one or more than one selected from a group consisting of a silicon, a silicon powder, a metallic mixed powder of a metal different from the silicon, a silicon inorganic mixture, a silicon alloy, a silicon wafer, and a waste slurry or a silicon inorganic mixture produced from a silicon process.

The plasma generator is configured to transfer the voltage of 5~20 kV to a silicon material through the electrodes and organic solvent in the chamber. More specifically, an electric energy will be charged to a capacitor which is referred to a high voltage charger, and upon an electrode switch being connected, the discharging is started, and the silicon material will be heated and turn into a plasma state, after which a silicon nanoparticle can be finally produced. The increase in a resistivity due to an increased temperature of the silicon material may contribute to spatially concentrating an energy consumption at the portion of a silicon material, thus producing a silicon nanoparticle. At the same time, a silicon carbide bonding and a carbon layer may be formed through a vaporization and condensation due to the instant generation of plasma and a resistive heating, and a silicon nanocomposite dispersion containing the same can be prepared. If the plasma power is less than 5 kV, a nanoparticle formation may be hard, and if it is over 20 kV, the nanoparticles of less than 50 nm may be mass-produced, so a silicon nanocomposite produced as the silicon of a high activity meets a carbon source may be turned into SiC a lot, for which it is not effective as an anode active substance.

As the thusly prepared silicon material is loaded, and the charging and discharging are repeatedly carried out, a silicon nanocomposite dispersion containing the particles of tens to thousands of grams can be prepared.

According to a method for preparing a silicon nanocomposite dispersion, a particle powder having an even granule can be obtained, and the process is simplified, and other chemical agents are not necessary except for the organic solvent and the dispersing agent, for which the process of the present invention is referred to a process producing less by-products and wastes. Since a vaporization and a plasma generation and extinction occur within tens of micro seconds, an actually supplied energy may be only 2~5 times of the vaporization energy of the silicon despite of an initial high voltage and an instant large current, which makes it possible to greatly reduce the energy consumption when generating particles, and a mass production can be available at a lower cost.

In the silicon nanocomposite dispersion prepared by the preparation method of the present invention, since the particles are dispersed in the organic solvent, which allows for an easier use, and since they are not discharged into the air, the preparation method of the present invention is environmentally friendly, and the environment and human body are less exposed to harmful environments.

A method for preparing a silicon nanocomposite powder for an anode active substance.

This method is referred to a method for preparing a silicon nanocomposite powder for an anode active substance in such a way to isolate a silicon nanocomposite dispersed in a silicon nanocomposite prepared by the present invention. More specifically, the method therefor may include, but is not limited to, obtaining a silicon nanocomposite slurry in such a way to filter a silicon nanocomposite dispersion prepared by the present invention and to centrifugally isolate the filtered dispersion; vacuum-drying the silicon nanocomposite slurry at 50~100° C.; and carrying out a high temperature heat treatment with respect to the dried silicon nanocomposite at 900~1200° C. under an inert environment (an argon); and disintegrating, dispersing and classifying the heat-treated silicon nanocomposite, through which a silicon nanocomposite powder for an anode active substance can be prepared.

The high temperature heat treatment is preferably carried out at 900~1200° C.

The silicon nanocomposite powder prepared by the aforementioned method may remain in a state where a silicon nanocomposite is coagulated, and the size of the silicon nanocomposite powder in the coagulated state is 1~500 µm.

A silicon nanocomposite anode.

This anode is referred to an anode formed of an anode active substance containing over 5% by weight of the silicon nanocomposite powder prepared by the present invention, a conduction material, a binder and an anode material including a filler.

The anode active substance may be added by 5~80 parts by weight with respect to 100 parts by weight of the anode material containing an anode active substance. Preferably, it is added by 70~80 parts by weight. The anode active substance may be formed of an anode active substance, which is able to occlude or discharge a lithium ion in addition to a lithium titanium oxide, for example a carbon, for example, a hard-graphitized carbon, a graphite carbon, etc.; a metallic complex oxide, for example, $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, a group-1 element, a group-2 element and a group-3 element, a halogen; $0<x\le1$; $1\le y\le3$; $1\le z\le8$); a lithium metal, a lithium alloy, a silicon alloy, a tin alloy; a metallic oxide, for example, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer, for example, a poly acetylene; and a Li—Co—Ni material.

The lithium secondary battery using an anode material according to the present invention employs as an anode active material the silicon carbide bonding and the carbon-coated silicon nanocomposite, thus inhibiting an anode expansion, by which it is possible to provide a specific capacity of 1400 mAh/g which is higher than 800 mAh/g of a specific capacity of the lithium secondary battery made of an anode active material prepared by the conventional preparing method of the Korean patent registration number 10-1142534. In the present invention, the expansion ratio of the silicon may be inhibited within 10~50%, so it is possible to provide a high capacity and high efficiency lithium secondary battery wherein the silicon anode active material is able to account for 5~80% as compared to the conventional technology wherein the anode active material can be added within 3~5%.

The anode may be prepared in such a way that an anode material-mixed solution prepared by mixing an anode material in a solvent, for example, a n-methyl pyrrolidone (NMP) is coated on an anode current collector and is dried, and is subjected to a rolling work.

The anode current collector, in general, is made with a thickness of 3~500 µm. The type of this anode current collector is not limited as long as it does not cause any chemical change to a corresponding battery, and it has a conductivity. For example, it may be made, for example, of a copper, a stainless steel, an aluminum, a nickel, a titan, a plasticized carbon, a material made by processing the surface of a copper or a stainless steel with a titan, a silver, etc., and an allot of an aluminum and a cadmium. The cathode current collector is able to enhance the bonding force of an anode active substance by forming small protrusions on the surface thereof. It may be implemented in various forms, for example, a film, a sheet, a foil, a net, a porous body, a foamed body, a nonwoven cloth, etc.

The conductive material may be added by 1~10% by weight with respect to the whole weight of the mixture including an anode active substance. The type of the conductive agent is not limited to as long as it has a predetermined conductivity while not causing a chemical change to a corresponding battery. For example, it may be formed of any of a graphite, for example, a natural graphite or an artificial graphite; a carbon black, for example, a carbon black, a super-p, an acetylene block, a Khenchen black, a channel black, a furnace black, a lamp black, a summer black, etc.; a conductive fiber, for example, a carbon, a metallic fiber, etc.; a conducive whiskey, for example, a zinc oxide, a potassium titanate, etc.; a conductive metallic oxide of a titanium oxide, etc.; and a conductive material, for example, a polyphenylene, etc.

The binder is a component which may assist the bonding of an anode active substance and a conductive material and the bonding with respect to an anode current collector and may be added by 1~10% by weight with respect to the whole wrights of the mixture including an anode active substance. The binder may be any of a PVDF, a PVA, a CMC, a starch, a hydroxypropyl cellulose, a recycled cellulose, a polyvinylrrolidone, a tetrafluoroethylene, a PE, a PP, an EDPM, a sulfonate EPDM, a styrene butyrene rubber, a fluorine rubber, various polymers, etc.

The filler may be a component which is able to inhibit the expansion of an anode and may be selectively used. The type of the filler is not limited to as long as it is a fibrous material, while not causing a chemical change to the battery. For example, it may be any of an olefin polymer, for example, a polyethylene, a polypropylene, etc.; and a fibrous substance, for example, a glass fiber, a carbon fiber, etc.

A lithium secondary battery.

This is referred to a lithium secondary battery which may be formed of a separator, an electrolyte and a cathode according to the preparing method of a typical lithium secondary battery using a silicon nanocomposite anode according to the present invention.

Referring to FIGS. 6 to 10, the lithium secondary battery made of a silicon anode active substance including a silicon carbide bonding and a carbon layer-coated silicon nanocomposite has an anode expansion ratio which is lowered to 10~50% thanks to the physical and mechanical strength effects of the bonded silicon carbide. Moreover, the room temperature service life characteristic can be enhanced, for example, the capacity of over 1400 mAh/g, the efficiency of over 98%, and the service life of over 80% can be obtained. The initial efficiency is 80~95% and the anode initial efficiency is 85~99.5%, which mean that the initial charging and discharging characteristics can be also enhanced.

The embodiments of the lithium secondary battery according to the present invention will be described in detail, but the right scope of the present invention is not limited by such embodiments.

EMBODIMENTS AND EXPERIMENTS

Embodiment 1

The organic solvent in the chamber may include a methanol. A pair of electrodes made of a stainless steel are installed. The silicon wafer of a thickness of 0.8 mm is cut at an interval of a width of 1 mm and a length of 100 mm, thus forming a rod. The silicon nanocomposite dispersion is prepared using a capacitor charged with the voltage of 11 kV. As seen in FIGS. 2, 3, 4 and 5, it is confirmed that a silicon carbide bonding or a carbon layer-coated silicon nanoparticle is prepared.

The silicon nanocomposite dispersion is filtered with a stainless steel mesh, and a centrifugation is carried out at 11000 rpm, thus preparing a silicon nanoparticle slurry.

The high temperature heat treatment of the slurry is carried out for 3~5 hours at 1100° C. under an argon environment, and it is subjected to a disintegration process, a dispersion process and a classification process, thus preparing a silicon nanocomposite nanoparticle powder.

A coin battery with a diameter of 20 mm and a height of 3.2 mm is prepared using 80% by weight of an anode active substance containing over 5% by weight of the silicon nanocomposite powder for an anode active substance, 10% by weight of a super-p conductive material and 10% by weight of a PVDF binder.

Embodiment 2

The polyvinylrrolidone is added to the organic solvent including a methanol at 0.5 parts by weight with respect to 100 parts by weight of the whole organic solvent. The other procedures are carried out same as the embodiment 1 except that the capacitor charged with the voltage of 11.5 kV is used, and the heat treatment is carried out at 1150° C. under an argon environment, and then a disintegration process, a dispersion process and a classification process are carried so as to make a powder lump which is hold together with the nanocomposite of the size of 1-500 μm.

Comparison Example 1

This is referred to a coin battery made of a silicon by Shin-etsu Co. Ltd.

The silicon by Shin-etsu Co. Ltd. is a silicon in which a silicon carbine and a carbon layer are not included.

Figure 2:
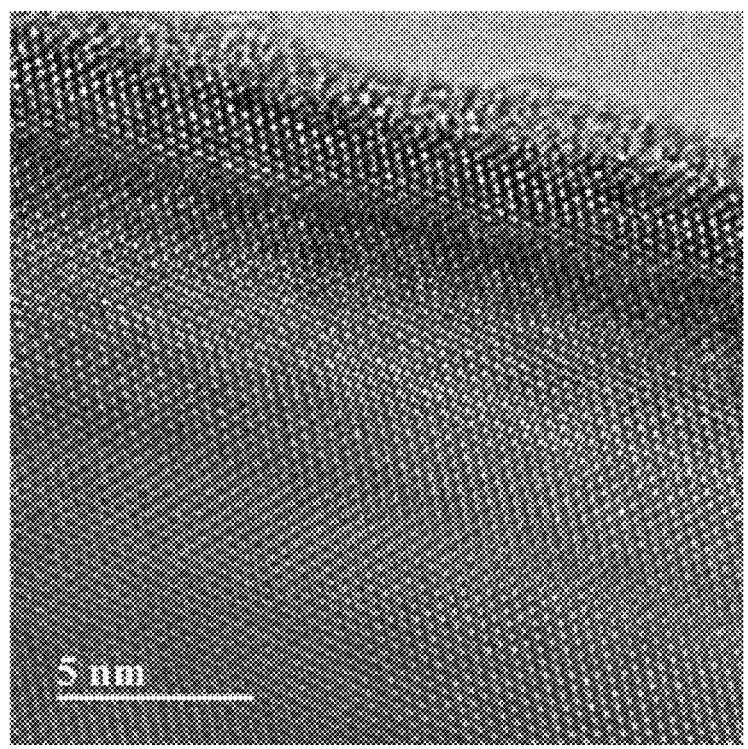
FIG. 2 is a TEM photo showing an anode active substance prepared according to the present invention.
Figure 3:
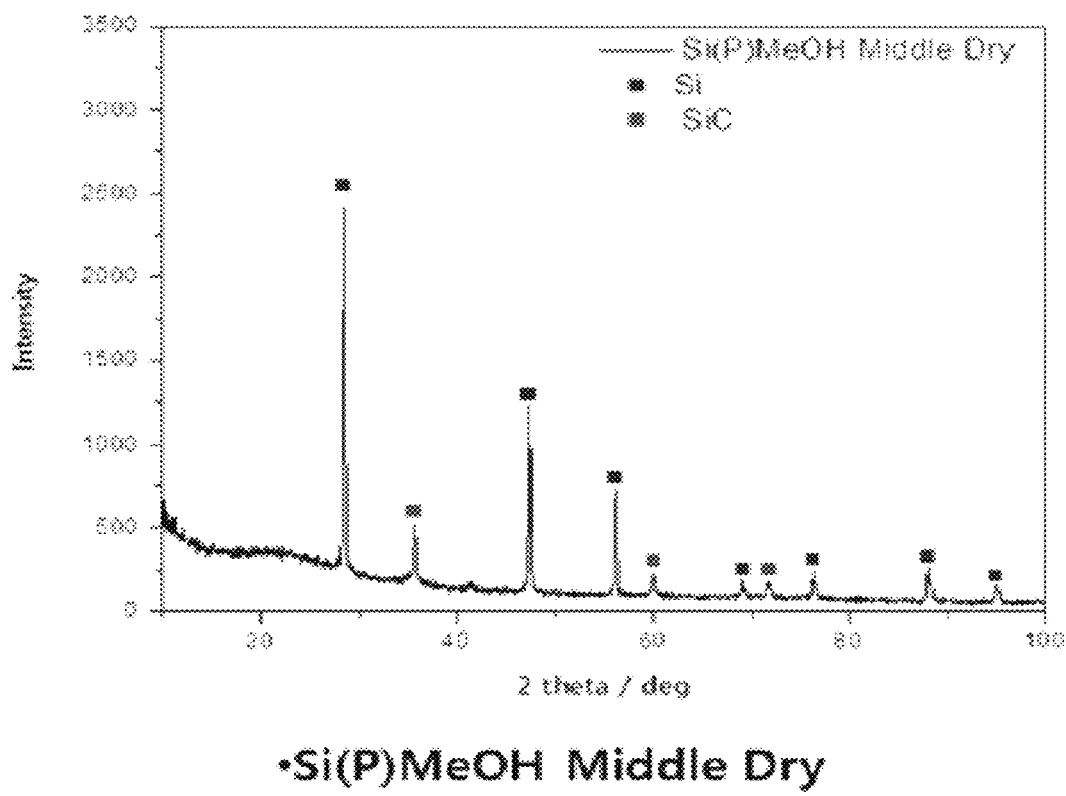
FIG. 3 is a XRD showing an anode active substance prepared according to the present invention.
Figure 4:
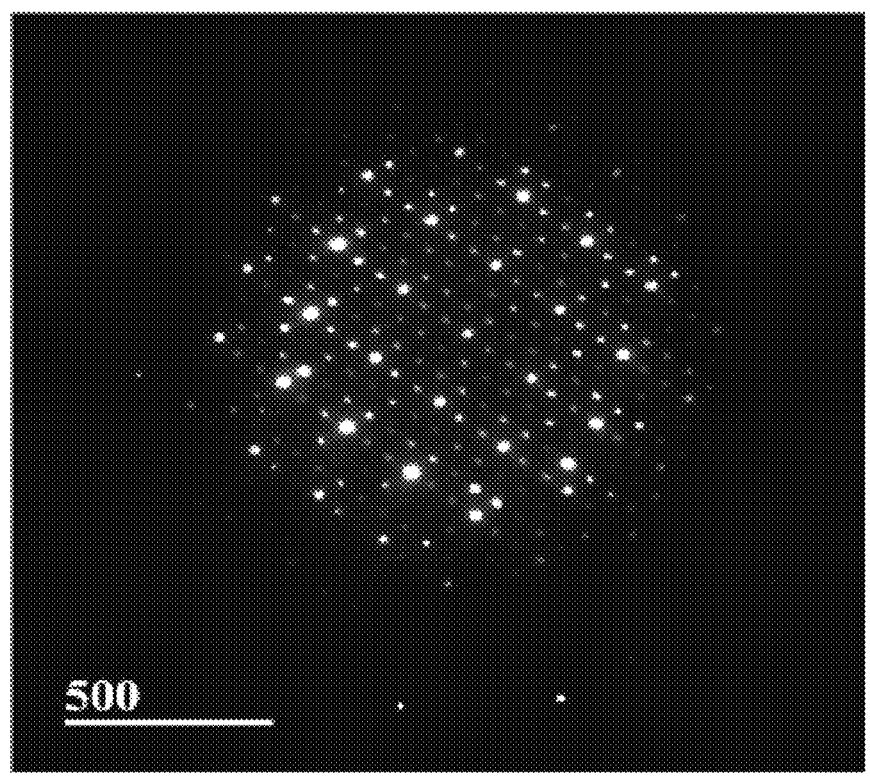
FIG. 4 is a lattice photo of a TEM showing a silicon carbide bonded to a particle prepared according to the present invention.

The TEM photo in FIG. 2 is referred to a photo wherein SiC is partly bonded to a silicon nanoparticle, and a graphite layer and a carbon are bonded. FIG. 3 is a view showing a result of the analysis of a silicon, a silicon carbide, and a carbon layer, while showing a X-ray diffraction of a silicon nanocomposite active substance. FIG. 4 is a view showing a lattice of a structure which separates a silicon and a silicon carbide.

Figure 5:
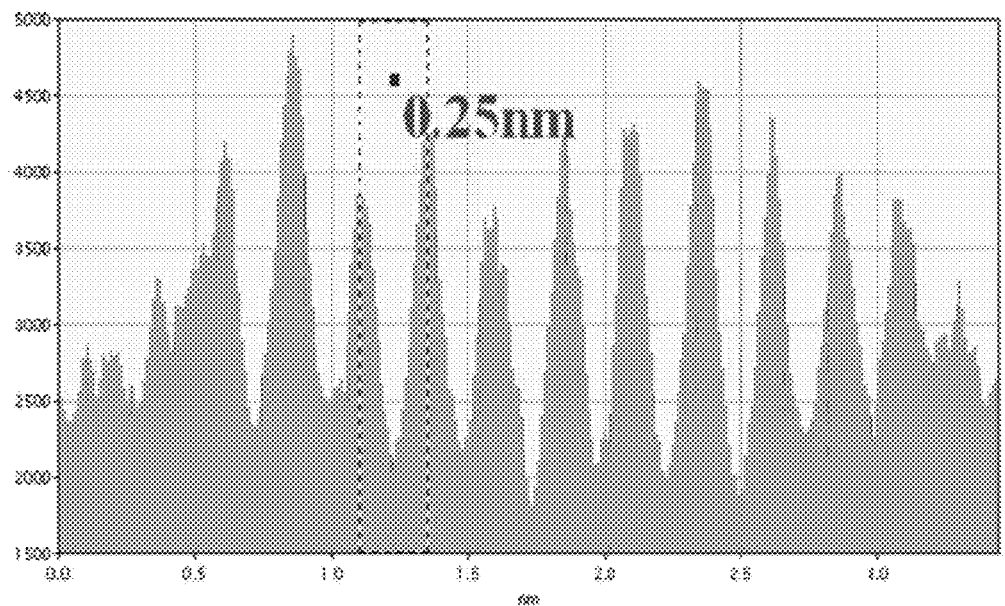
FIG. 5 is a TEM photo showing the thickness of a silicon carbide bonded to a particle prepared according to the present invention.

FIG. 5 is a view showing a thickness of a silicon carbide which is bonded over a silicon nanoparticle.

Figure 6:
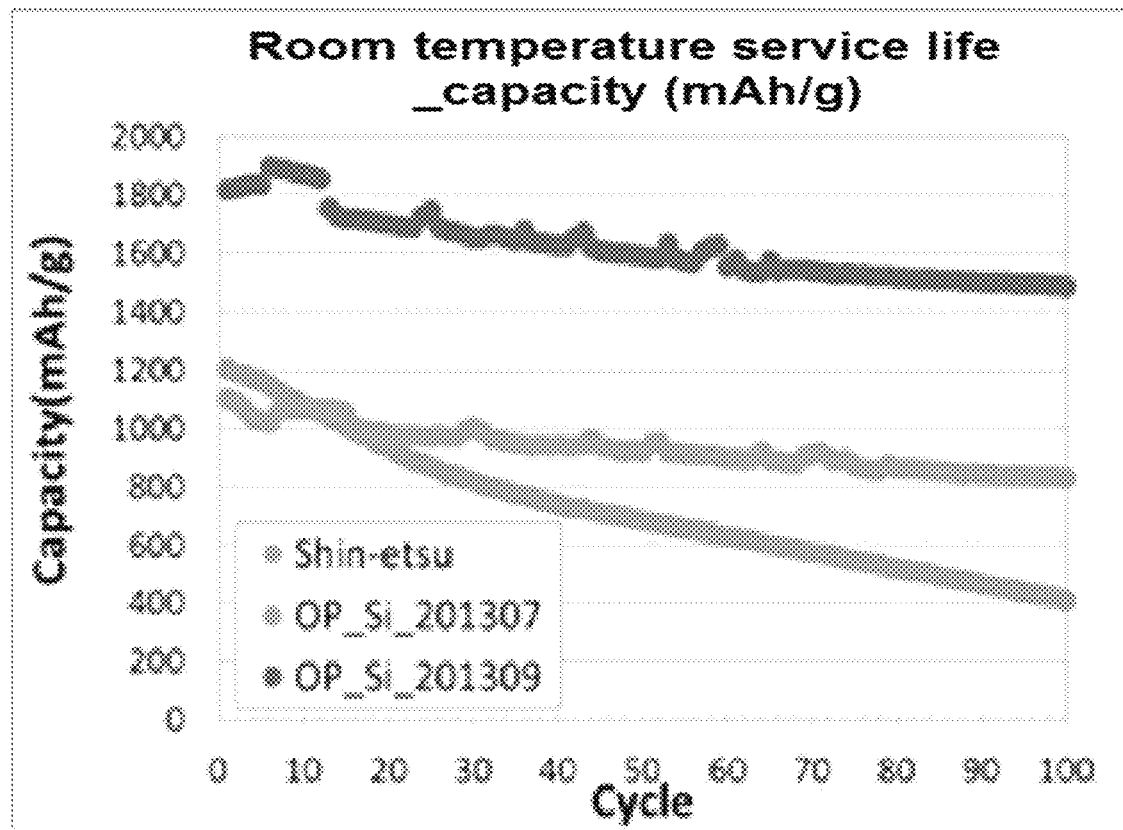
FIG. 6 is a view showing a room temperature service life characteristic (a capacity, mAh/g) of a lithium secondary battery prepared according to the present invention.
Figure 7:
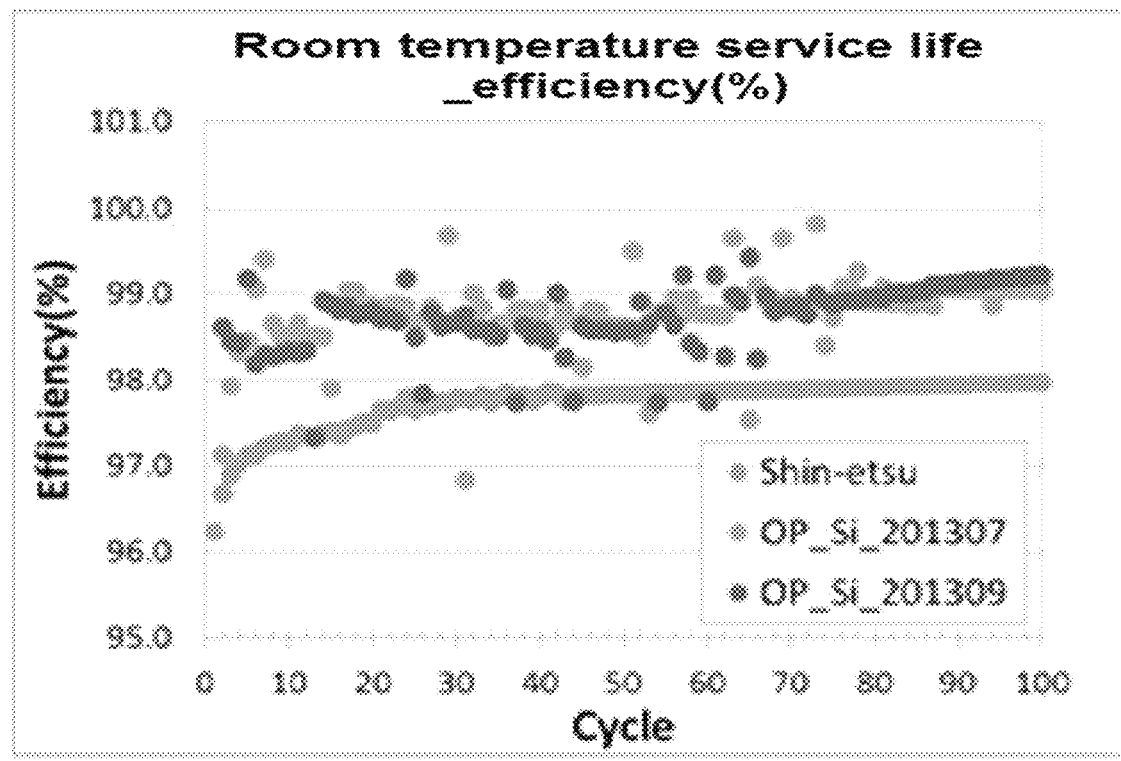
FIG. 7 is a view showing a room temperature service life (an efficiency %) of a lithium secondary battery prepared according to the present invention.
Figure 8:
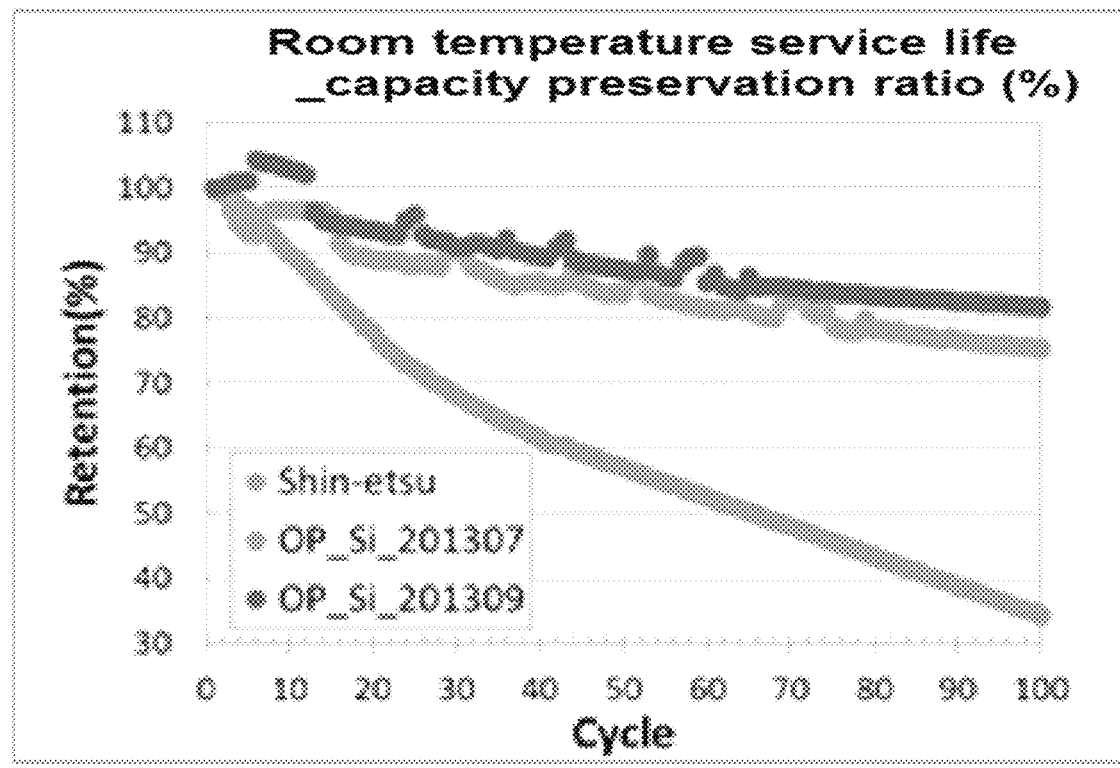
FIG. 8 is a view showing a room temperature service life (a capacity preservation ratio %—a service life @100 times) prepared according to the present invention.

FIGS. 6 to 8 are views showing a room temperature service life characteristic of a lithium secondary battery made of a silicon nanocomposite anode active substance. FIG. 6 is a graph showing a capacity of a coin battery. In case of the coin battery which is a comparison example, if it is repeatedly subjected to a charging and discharging cycle more than 100 times, the capacity is fast reduced; however in case of the coin battery of the embodiment 1 (OP_Si_201307) and the embodiment 2 (OP_Si_201309), the capacity is gradually reduced even though it is repeatedly subjected to the cycle 100 times. According to the embodiment 2, even though it is repeatedly subjected to the cycle 100 times, the capacity maintains over 1400 mAh/g.

FIG. 7 is a graph showing the efficiency (%) of the coin battery. It shows that both the embodiments 1 and 2 have higher efficiencies than the comparison example.

FIG. 8 is a graph showing the capacity preservation ratio (%) of the coin battery. If the coin battery which is a comparison example, is repeatedly subjected to a charging and discharging cycle, the capacity is fast reduced. If it is repeatedly subjected to the cycle 100 times, the capacity preservation ratio is below 40%, and in case of the coin battery of the embodiments 1 and 2, even if it is repeatedly subjected to the cycle 100 times, the capacity is gradually reduced. In case of the embodiment 2, even if it is repeatedly subjected to the cycle 100 times, the capacity preservation ratio maintains over 80%, and the embodiment 1 maintains over 75%.

Figure 9:
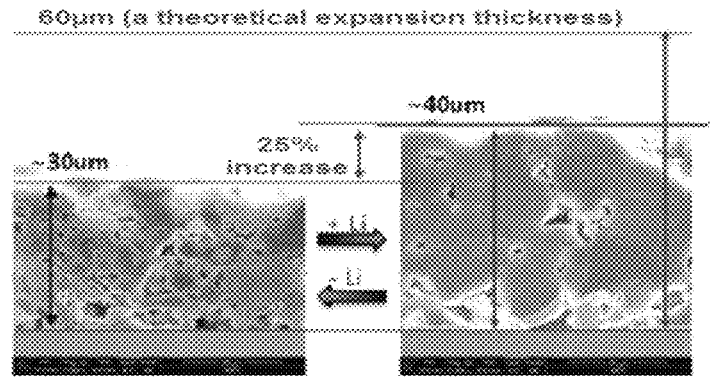
FIG. 9 is a view showing an anode expansion ratio of a lithium secondary battery prepared according to the present invention.

FIG. 9 is a view showing an expansion inhibition level of a silicon nanocomposite anode based on a physical and mechanical high strength effect and a durable carbon layer of a silicon carbide bonded to a silicon nanoparticle when charging and discharging a coin battery. In case of a lithium secondary battery which uses a silicon anode, a volume expansion may occur due to the chemical bonding between a silicon and a lithium when charging and discharging. This theoretical expansion ratio is about 100~400%, but the anode of the lithium secondary battery according to the present invention may allow to reduce the anode expansion ratio to 10~50% as the physical and mechanical high strength effect from the bonded silicon carbide and the durable carbon layers function to further inhibit the expansion of the silicon core. In this way, the silicon anode blending content can be increased.

Figure 10:
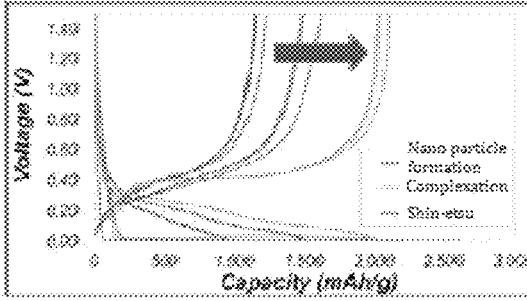
FIG. 10 is a view showing an initial charging and discharging characteristic of a lithium secondary battery prepared according to the present invention.
Figure 10:
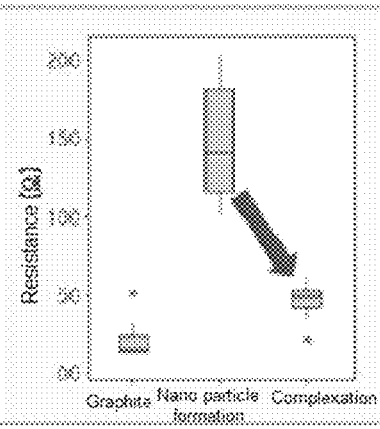

FIG. 10 is a view showing an initial charging and discharging characteristic of a coin battery. In terms of the charging and discharging characteristics, the initial charging capacity of the lithium secondary battery according to the present invention is 2500~3000 mAh/g, and the initial discharge capacity is 2000~2500 mAh/g, and the initial efficiency is 80~95%, and the anode initial efficiency is 85~99.5%.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A silicon nanocomposite consisting of:
 a silicon nanoparticle having an average diameter of 100-300 nm; and
 a silicon carbide bonding which is configured on at least one region of a surface of the silicon nanoparticle with a thickness of 0.1-0.5 nm, wherein:
  a surface area where the silicon carbide bonding is formed, as compared to a whole surface area of the silicon nanoparticle, accounts for 10-50%, and
  a surface of the silicon nanocomposite further includes a carbon layer of a thickness of 3-15 nm.

* * * * *